United States Patent [19]

Jackson et al.

[11] Patent Number: 4,678,909

[45] Date of Patent: Jul. 7, 1987

[54] OPTICAL PRESSURE SENSING APPARATUS

[75] Inventors: David A. Jackson, Canterbury, England; Michael Corke, Wheaton, Ill.; Alan D. Kersey, Washington, D.C.; Julian D. C. Jones, Sittingbourne, England

[73] Assignee: Kent Scientific and Industrial Projects Limited, Canterbury, England

[21] Appl. No.: 810,324

[22] PCT Filed: Apr. 1, 1985

[86] PCT No.: PCT/GB85/00136

§ 371 Date: Nov. 25, 1985

§ 102(e) Date: Nov. 25, 1985

[87] PCT Pub. No.: WO85/04473

PCT Pub. Date: Oct. 10, 1985

[30] Foreign Application Priority Data

Mar. 31, 1984 [GB] United Kingdom ................. 8408383

[51] Int. Cl.$^4$ ............................................. G01B 11/02
[52] U.S. Cl. .................................. 250/231 P; 73/705; 356/358
[58] Field of Search ...................... 73/705; 250/231 P; 356/352, 356, 358, 354

[56] References Cited

U.S. PATENT DOCUMENTS 4,464,936 8/1984 McIntire et al. ...................... 73/705
4,547,668 10/1985 Tsikos .............................. 73/705 X
4,588,886 5/1986 Snider .............................. 73/705 X

FOREIGN PATENT DOCUMENTS 0013974 8/1980 European Pat. Off. .
0021199 1/1981 European Pat. Off. .
3031961 3/1982 Fed. Rep. of Germany .
55-15832 9/1981 Japan .

OTHER PUBLICATIONS

Hesse, Joachim, and Sohler, W., "Faser Optishe Sensoren", *Elecktronik*, 6-18-82, pp. 89-92.

Primary Examiner—Eugene R. LaRoche
Assistant Examiner—Steven J. Mottola
Attorney, Agent, or Firm—Bell, Seltzer, Park & Gibson

[57] ABSTRACT

Optical pressure sensing apparatus comprises an optical fibre interferometer arranged to sense the movement of a pressure responsive element and produce an interference signal at its output which can be monitored and processed to measure changes in the pressure applied to the pressure responsive element. The interferometer comprises a signal arm coupled to the pressure responsive element and a fixed reference arm. A light source supplies light to the input of the interferometer via an optical fibre and monitoring and processing electronics connected to the output determine the optical phase shift between the light beams propagated in the signal and reference arms and produce a pressure reading.

10 Claims, 2 Drawing Figures

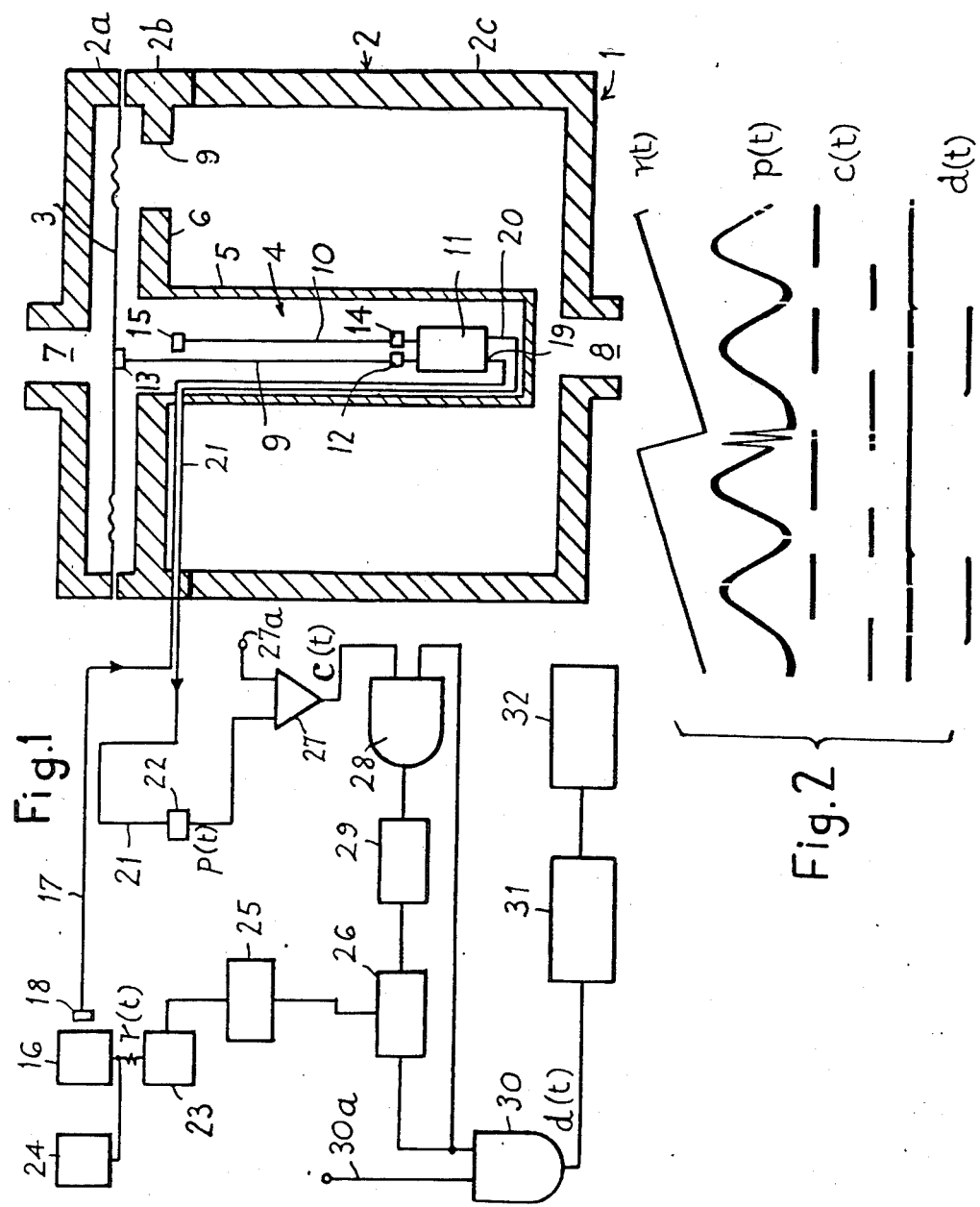

OPTICAL PRESSURE SENSING APPARATUS

BACKGROUND OF THE INVENTION

The present invention relates to optical pressure sensing apparatus and, more particularly, to such apparatus utilising the principles of an optical fibre interferometer for sensing small pressure induced displacements of a pressure responsive element.

The principles of interferometery are well known and their application to the sensitive measurement of displacements is also established. However, the necessity of having to use large and heavy optical components and light sources in precise alignment has limited their practical application.

SUMMARY OF THE INVENTION

An object of the present invention is to provide a pressure sensing apparatus which employs the high sensitivity of an optical fibre interferometer to achieve both improved sensitivity to small pressure changes and measurement over a large dynamic range.

To this end, the invention consists in an optical pressure sensing apparatus characterised by an optical fibre interferometer device arranged to sense the movement of a resilient pressure responsive element, whereby an interference signal produced at an output of the interferometer device is responsive to change in the pressure applied to the pressure responsive element. The latter may be any type of resilient element employed for pressure sensing purposes, for example, a diaphragm, capsule or one of a selection of tubes of different geometries, and an element of appropriate mechanical properties is selected depending upon the particular application.

Preferably, the interferometer device comprises individual optical fibre signal and reference arms, the signal arm being mechanically or optically coupled to the pressure responsive element so that the length of the optical path defined by the signal arm changes relatively to that of the reference arm in response to movement of the pressure responsive element. The signal and reference arms have equal responses to physical pertubations, such as, temperature changes, other than the desired pressure measurand and these cancel one another by the process of common mode rejection. Such apparatus therefore shows negligible cross sensitivity. Moreover, once calibrated, such apparatus may be used to measure gauge pressure regardless of other environmental changes. In a preferred embodiment, the signal optical fibre is secured at or adjacent one end to a fixed location on the apparatus and has its opposite end, or a portion of its length, fastened to the pressure responsive element so that it is under tension, whilst the reference optical fibre is secured at or adjacent both its opposite ends to fixed locations on the apparatus. In order to compensate more fully for physical pertubations other than the measurand, the reference arm is disposed, relatively to the signal arm, in the optimum position for this purpose and to this end, may, for example, also have its distal end, or a part of the reference fibre, attached to a non-movable location of the pressure responsive element.

The interferometer may be of the Michelson or Mach Zehnder type and have an input and output coupled by coupling means to signal and reference arms which are conveniently constructed from single mode optical fibre. With the Michelson configuration, the distal ends of the signal and reference fibres are reflective so as to reflect light beams propagating in the fibres, and the distal end of the signal fibre is mechanically attached to the pressure responsive element. The coupling means is adapted to mix the reflected beams in the two fibres to produce an interference signal at the output of the inferferometer. With the Mach Zehnder configuration, the input and output are disposed at opposite ends of the signal and reference fibres and a portion of the length of the signal fibre is fastened to the pressure responsive element. The output coupling means mixes the beams independently propagated in the signal and reference fibres to produce the interference signal at the output.

In other embodiments of the invention, the interferometer device may comprise a Fabry Perot or Polarimetric configuration, in which event the signal and reference arms, in effect, each comprise an individual interferometer of one of these types. The proximal end of each arm is coupled to an input and output via suitable coupling means, for example, a beam splitting device, which is adapted to launch light into the arm and recover an interference signal therefrom. The distal end of the signal arm may be mechanically attached to the pressure responsive element.

The apparatus may include a light source for illuminating the interferometer device, for example, a laser light source, and means for detecting and processing the output signal(s) to determine the optical phase difference or shift between light beams propagated in the signal and reference arms, which phase shift is related to a change in the pressure applied to the pressure responsive element. Preferably, the laser light source is coupled to the input of the interferometer device by a single mode optical fibre and the detecting and processing means may also be coupled to the output(s) by optical fibre, so that the pressure sensing head, itself, has a remote installation capability.

The arrangement of the light source and signal detection/processing means may be similar to that described in our International Specification No. WO84/04385 in conjunction with a temperature sensor. Hence, means may be provided for modulating the laser injection current of a laser light source so as to produce a moving interference pattern which is detected at the or each output of the interferometer device by a photodetector and processed to determine the optical phase shift(s) between the light beams propagated in the signal and reference arms. The processing means may be arranged to compare the laser current modulating signal with the signal at the output of the photodetector to derive a signal corresponding to the optical phase shift.

BRIEF DESCRIPTION OF THE DRAWINGS

In order that the present invention may be more readily understood, reference will now be made to the accompanying drawings, in which:

FIG. 1 is a schematic and block circuit diagram of one embodiment of the invention, and FIG. 2 illustrates the signal waveforms occurring at various points in the circuit of FIG. 1.

DESCRIPTION OF THE PREFERRED EMBODIMENTS

Referring to FIG. 1, the apparatus includes a pressure sensing head 1 which comprises a cylindrical housing 2 containing a pressure responsive element 3, in the form of a resilient diaphragm secured across one end of the housing, and an interferometer device 4 arranged to sense movements of the diaphragm 3. The interferometer is housed in a tube 5 which is supported in the housing 2 from a support plate 6 secured to the walls of the housing. As illustrated, the latter may be formed in three parts 2a, 2b, 2c to permit ready assembly of the housing with the diaphragm and interferometer within the housing. Differential fluid pressure is applied to the diaphragm 3 via ports 7 and 8 in opposite ends of the housing and an opening 9 in the support plate 6. For example, one of the ports 7,8 may be connected to a source of pressure to be monitored whilst the other port is connected to atmosphere.

The interferometer 4 comprises optical fibre signal and reference arms 9,10 disposed juxtaposed one another and formed from single mode optical fibre. Light is launched into the respective optical fibres, and reflected light is recovered therefrom, by a single mode fibre optic directional coupler 11 connected to the proximal ends of the fibres, and the distal ends of the latter may be coated to improve reflectance. Adjacent its proximal end, the signal fibre 9 is rigidly secured to a fixed location 12 on the support tube 5 whilst its distal end is attached to the centre of the pressure sensitive diaphragm 3 at 13 so that the signal fibre is maintained under tension. The reference fibre 10 is rigidly secured at or adjacent both its proximal and distal ends to fixed locations 14,15 on the support tube.

Light from a single frequency semi-conductor diode laser 16 is launched into a single mode optical fibre 17, via an isolator 18 and is supplied to the input 19 of the interferometer at the directional coupler 11 which amplitude divides the light into the signal and reference fibres 9,10. The resulting optical beams propagated in the signal and reference fibres are reflected from the distal ends of the fibres back to the coupler 11 which coherently recombines the light to produce an interference signal at the output 20 of the interferometer, which signal is monitored to recover the optical phase difference between the signals in the two fibres from the intensity of the recombined light signals. In the present embodiment, this is achieved by using a signal processing technique similar to that described in our aforementioned International specification. The light intensity is conveniently monitored by guiding the interference signal through an optical fibre 21 to a photodetector 22. The light source 16, detector 22 and signal processing electronics may therefore be situated remotely from the pressure sensing head 1.

The signal fibre 9 is maintained under tension such that a change in differential pressure across the pressure responsive diaphragm 3 results in a change in the length of the signal optical fibre. Hence, by detecting and processing the interference signal produced at the output 20 the pressure change may be determined. In one typical example having an Inconel x circular diaphragm 3 of thickness 0.102 mm (0.004") and diameter 71.1 mm (2.800") differential pressure measurements in the range 0–100 mbar with a resolution of $10^{-4}$ mbar have been achieved. As the signal and reference fibers 9,10 are housed in a similar environment, their equal responses to physical perturbations, for example, temperature, other than the pressure measurand, cancel one another out by the process of common mode rejection. The device therefore shows negligible cross sensitivity and, once calibrated, does not normally require recalibration for different applications or changes in the environment in which it is used.

The signal processing system comprises an oscillator or ramp generator 23 for modulating the laser injection current which is supplied by a DC cell 24 (e.g. a Ni-Cad cell), with a high frequency ramp current. This ramping signal may have a frequency in the range from 100 Hz–10 kHz, e.g. 5 kHz. A high frequency reference square wave derived from the oscillator 23 via a JK flip-flop 25, which also divides the signal by two, is supplied to one input of the phase comparator 26.

The output from the photodiode detector 22 is connected to one input of a high gain comparator 27 having its other input 27a connected to a reference voltage. The output of the comparator 27 is a square wave and this is fed to one input of a logic AND gate 28 having its output connected, via a JK flip-flop 29, which divides the signal from the AND gate 28 by two, to the second input of the phase comparator 26. The output of the latter is connected to the second input of the AND gate 28 and also to one input of a second logic AND gate 30 having its other input 30a connected to receive pulses from a clock pulse generator, for example, a 1 MHz-generator. The signals from the output of the gate 30 are fed, via a timer 31, to a microprocessor 32 for processing and storing.

In FIG. 2, r(t) and p(t) show the time variation of the optical intensity at the interferometer output when the laser injection current is ramp-modulated. This output is fed to the high-gain comparator 27 and 'hard-limited' to form a series of pulses c(t). The remaining electronics measure the time $t_1 = (\tau - \tau_D)$ where $\tau$ is the time, between the start of the ramp r(t) and the first negative edge encountered in the photodiode output signal p(t), and $\tau_D$ is the time delay. This time, $t_1$ is directly related to the optical phase shift between the arms 9,10 of the interferometer; $t_1$ is measured by performing a phase comparison between the square wave, derived from the first negative edge in the photodiode output in each ramp period, and the reference square wave obtained directly from the ramp generator 23. The ramp generator frequency is chosen to be two orders of magnitude higher than the pressure induced fringe drift rate so that relatively simple decision making electronics are used to determine when the fringe pattern corresponds to a new fringe number. By using the 1 MHz clock an accurate determination of the pulse width $t_1$ is obtained, from which the direction and magnitude of the pressure change is determined. The lower two traces c(t) and d(t) in FIG. 2 show the output of the comparator 27 in the upper trace and the input of the microcomputer 32 in the lower trace.

Whilst a particular embodiment has been described, it will be understood that modifications can be made without departing from the scope of the invention as defined by the appended claims. For example, the interferometer 4 may be constructed in a Mach Zehnder configuration instead of the Michelson arrangement illustrated. In this event, the optical fibre signal arm 9 has a portion of its length fastened along the surface of the diaphragm 3 and the input and outputs are at opposite ends of the signal and reference arms. In other embodiments, the signal and reference arms 9,10 may each be formed as a Fabry Perot or Polarimetric interferometer with the light being launched into and recovered from the proximal ends of the interferometers via associated beam splitting devices. With the Fabry Perot configuration, the light may be supplied to the signal and reference arms via fibre optic leads which are connected to the fibre optic arms by reflective splices. With the Polarimetric configuration, the signal and reference arms are made from birefringent fibre. In either of the latter two embodiments, signal processing systems similar to that illustrated in FIG. 1 may be connected to each arm and the outputs from the two systems may be compared to produce a pressure measurement signal which is substantially independent of changes in other environmental conditions in which the pressure sensing head 1 is used.

We claim:

1. Optical pressure sensing apparatus comprising in combination:

a resilient pressure responsive element, means mounting said pessure responsive element for displacement in response to differential pressure applied to said pressure responsive element, optical fibre interferometer means arranged to sense pressure induced displacement of said pressure responsive element, said interferometer means including an optical fibre signal arm, an optical fibre reference arm, optical input means for launching light into said signal and reference arms to propagate light beams therein, and output means for combining said light beams propagated in said signal and reference arms to produce an interference signal at said output means, said signal and reference arms being mounted to respond similarly to physical perturbations other than the pressure measurand, means coupling said signal arm to said pressure responsive element so that the length of the optical path defined by said signal arm changes relatively to that of said reference arm in response to said pressure induced displacement of said pressure responsive element, a light source coupled to said input means of said interferometer device, and processing means coupled to said output means for monitoring said interference signal at said output means to determine the optical phase shift between said light beams propagated in said signal and reference arms and produce an output signal corresponding to said differential pressure.

2. The apparatus claimed in claim 1, wherein said signal and reference arms are disposed in close proximity relatively to one another and have proximal and distal ends, said signal arm is secured to a fixed location adjacent its proximal end and is mechanically coupled to said pressure responsive element so that said signal arm is under tension, and said reference arm is secured adjacent both its proximal and distal ends to fixed locations.

3. The apparatus claimed in claim 2, including coupling means comprising said input and output means coupled to said proximal ends of said signal and reference arms, said signal and reference arms having reflective distal ends with said distal end of said signal arm being coupled to said pressure responsive element, and said coupling means being adapted to launch said light into said signal and reference arms and to recover the reflected light beams propagated in said signal and reference arms to produce said interference signal at said output means.

4. The apparatus claimed in claim 1, wherein said light source is coupled to said input means of said interferometer means via a single mode optical fibre.

5. The apparatus claimed in claim 4, wherein said processing means is coupled to said output means by optical fibre.

6. The apparatus claimed in claim 1, wherein said light source comprises a laser light source, and means is provided for modulating the laser injection current to produce said interference signal at said output means in the form of a moving interference pattern.

7. The apparatus claimed in claim 6, wherein said modulating means modulates said injection current of said laser with a ramp modulating signal to produce a linearly moving interference signal at said output means.

8. The apparatus claimed in claim 7, wherein said processing means compares said modulating signal supplied by said modulating means with said interference signal at said output means to derive a signal corresponding to said optical phase shift.

9. The apparatus claimed in claim 1, wherein said pressure responsive device is mounted within first housing means having ports on opposite pressure sides of said pressure responsive device for the application of said differential pressure thereto, and wherein said interferometer means is mounted within second housing means supported within said first housing means with said signal and reference arms being mounted in said second housing means in juxtaposed relation.

10. The apparatus claimed in claim 9, wherein said pressure responsive means comprises a resilient diaphragm secured across said first housing means, said signal and reference arms comprise single mode optical fibres disposed in juxtaposed relation with said second housing means and having proximal and distal ends, said distal ends of said signal and reference arms are reflective, a single mode fibre optic directional coupler comprises said input and output means and is connected to said proximal ends of said signal and reference arms for launching said light into said signal and reference arms and for recovering and combining the reflected light beams propagated therein, said signal arm is secured adjacent said proximal end thereof to said second housing means and has said distal end thereof mechanically coupled to said diaphragm so as to be maintained under tension and said reference arm is secured adjacent said proximal and distal ends thereof to said second housing means.

* * * * *